United States Patent
Chang et al.

(10) Patent No.: US 11,024,056 B2
(45) Date of Patent: Jun. 1, 2021

(54) IMAGE PROCESSING FOR EYE LOCATION IDENTIFICATION

(71) Applicant: GM GLOBAL TECHNOLOGY OPERATIONS LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 135 days.

(21) Appl. No.: 16/560,035

(22) Filed: Sep. 4, 2019

(65) Prior Publication Data

US 2021/0065401 A1     Mar. 4, 2021

(51) Int. Cl.
  *G06T 7/73*    (2017.01)
  *G06T 5/00*    (2006.01)
  *G06K 9/00*    (2006.01)
  *G05D 1/00*    (2006.01)

(52) U.S. Cl.
  CPC ............ *G06T 7/75* (2017.01); *G05D 1/0016* (2013.01); *G06K 9/00845* (2013.01); *G06T 5/003* (2013.01); *G05D 1/0061* (2013.01); *G05D 2201/0213* (2013.01); *G06T 2207/20048* (2013.01); *G06T 2207/30201* (2013.01); *G06T 2207/30268* (2013.01)

(58) Field of Classification Search
  CPC . G06T 7/75; G06T 5/003; G06T 2207/30201; G06T 2207/30268; G06T 2207/20048; G06K 9/00845; G05D 1/0016; G05D 1/0061; G05D 2201/0213
  See application file for complete search history.

(56) References Cited

U.S. PATENT DOCUMENTS

| | | | | |
|---|---|---|---|---|
| 6,095,989 A | * | 8/2000 | Hay | A61B 3/0025 600/558 |
| 8,885,882 B1 | * | 11/2014 | Yin | G06K 9/00248 382/103 |
| 2017/0185037 A1 | * | 6/2017 | Lee | G03H 1/2286 |
| 2019/0324276 A1 | * | 10/2019 | Edwin | G09G 5/003 |

* cited by examiner

*Primary Examiner* — Christopher M Brandt
(74) *Attorney, Agent, or Firm* — Lorenz & Kopf, LLP

(57) ABSTRACT

In various embodiments, methods, systems, and vehicles are provided for locating an eye of an occupant of a vehicle. In an exemplary embodiment, a system is provided that includes: (i) a camera configured to generate a camera image of an occupant for a vehicle; and (ii) a processor coupled to the camera and configured to at least facilitate: (a) performing one or more Fourier transforms of the camera image; and (b) identifying a location for an eye of the occupant of the vehicle, using a phase model generated via the one or more Fourier transforms.

20 Claims, 3 Drawing Sheets

IMAGE PROCESSING FOR EYE LOCATION IDENTIFICATION

TECHNICAL FIELD

The technical field generally relates to the field of vehicles (e.g., land-based vehicles, water-based vehicles, and aircraft) and, more specifically, to methods and systems for identifying a location of an eye of an individual in the vehicle.

BACKGROUND

Certain vehicles include a head-up display in for providing information to a driver of the vehicle. Such head-up displays may require a detected location of an eye of the driver, for example in order to display the information in a visible manner for the driver to see.

Accordingly, it is desirable to provide improved methods and systems for locating an eye of a driver of a vehicle. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided that includes: obtaining a camera image of an occupant of a vehicle, via a camera of the vehicle; performing, via a processor, one or more Fourier transforms of the camera image; and identifying, via the processor, a location for an eye of the occupant of the vehicle, using a phase model generated via the one or more Fourier transforms.

Also in one embodiment, the method further includes performing a control action for the vehicle, based on the identified location of the eye.

Also in one embodiment, the step of performing the one or more Fourier transforms includes performing, via the processor, an inverse Fourier transform of the camera image.

Also in one embodiment, the step of performing the one or more Fourier transforms further includes performing, via the processor, generating a phase-only hologram for the camera image.

Also in one embodiment, the step of performing the one or more Fourier transforms further includes performing, via the processor, an additional Fourier transform, generating an enhanced image for the camera image.

Also in one embodiment, the enhanced image includes highlighted edges for a face of the occupant.

Also in one embodiment, the step of performing the one or more Fourier transforms further includes performing image processing with a tuned threshold, generated a further enhanced image for the camera image that includes further highlighted edges for the face of the occupant.

In another exemplary embodiment, a system is provided that includes: (i) a camera configured to generate a camera image of an occupant for a vehicle; and (ii) a processor coupled to the camera and configured to at least facilitate: (a) performing one or more Fourier transforms of the camera image; and (b) identifying a location for an eye of the occupant of the vehicle, using a phase model generated via the one or more Fourier transforms.

Also in one embodiment, the processor is further configured to at least facilitate performing a control action for the vehicle, based on the identified location of the eye.

Also in one embodiment, the processor is further configured to at least facilitate performing an inverse Fourier transform of the camera image.

Also in one embodiment, the processor is further configured to at least facilitate performing a phase only transform, generating a phase-only hologram from the camera image.

Also in one embodiment, the processor is further configured to at least facilitate performing an additional Fourier transform, generating an enhanced image for the camera image.

Also in one embodiment, the enhanced image includes highlighted edges for a face of the occupant.

Also in one embodiment, the processor is further configured to at least facilitate performing one or more further Fourier transforms with a tuned threshold, generated a further enhanced image for the camera image that includes further highlighted edges for the face of the occupant.

In another exemplary embodiment, a vehicle is provided that includes: (i) a body; (ii) drive system configured to move the body; (iii) a camera mounted on the body, the camera configured to generate a camera image of an occupant for the vehicle; and (iv) a processor coupled to the camera and configured to at least facilitate: (a) performing one or more Fourier transforms of the camera image; and (b) identifying a location for an eye of the occupant of the vehicle, using a phase model generated via the one or more Fourier transforms.

Also in one embodiment, the processor is further configured to at least facilitate performing a control action for the vehicle, based on the identified location of the eye.

Also in one embodiment, the processor is further configured to at least facilitate performing an inverse Fourier transform of the camera image.

Also in one embodiment, the processor is further configured to at least facilitate performing a phase only transform, generating a phase-only hologram for the camera image.

Also in one embodiment, the processor is further configured to at least facilitate performing an additional Fourier transform, generating an enhanced image for the camera image, wherein the enhanced image includes highlighted edges for a face of the occupant.

Also in one embodiment, the processor is further configured to at least facilitate performing one or more further Fourier transforms with a tuned threshold, generated a further enhanced image for the camera image that includes further highlighted edges for the face of the occupant.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
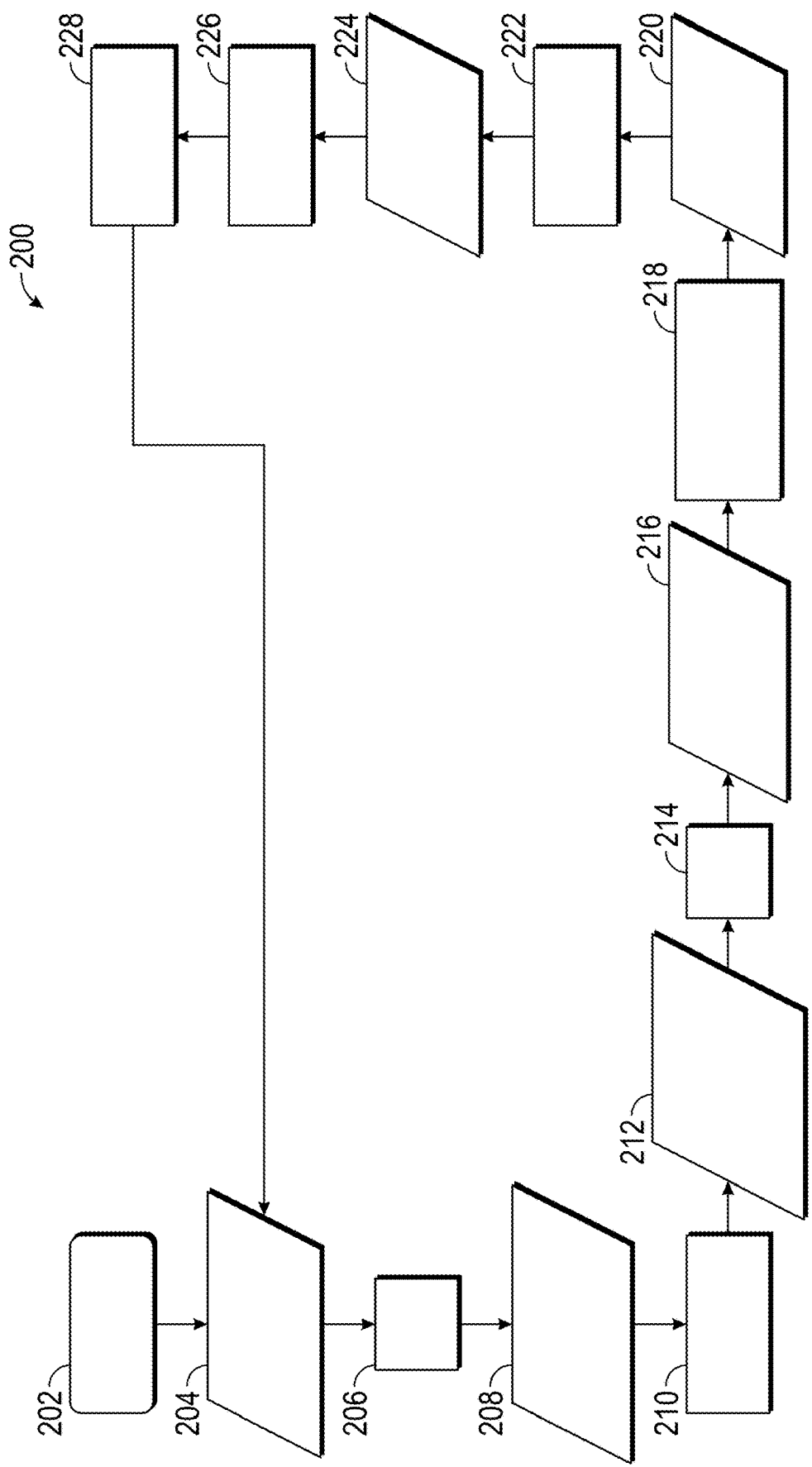
FIG. 1 is a flowchart of a process for identifying a location of an eye of an occupant of a vehicle, in accordance with an exemplary embodiment.
Figure 2:
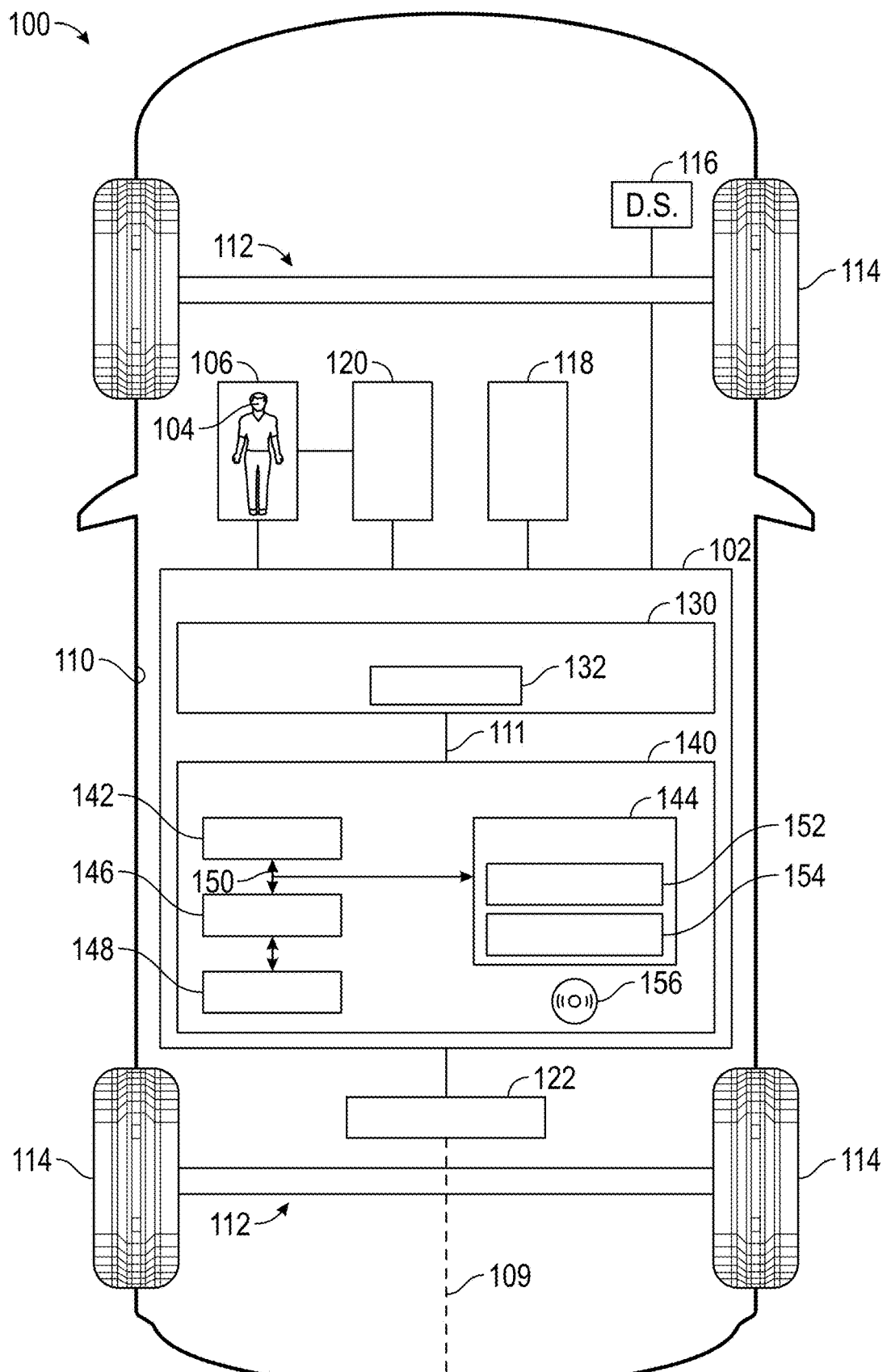
FIG. 2 is a functional block diagram of a vehicle that includes a control system for identification a location of an eye of an occupant of the vehicle, and that can be utilized in connection with the process of FIG. 1, in accordance with an exemplary embodiment.

FIG. 1 is a flowchart of a process 200 for identifying and utilizing a location of an eye of a driver of a vehicle, in accordance with an exemplary embodiment. In various embodiments, the process 200 may be implemented in connection with one or more vehicles, such as the vehicle 100 depicted in FIG. 2 and described below. In certain embodiments, the process 200 is implemented in a land-based vehicle, such as an automobile, truck, or other land-based vehicle (e.g., as depicted in FIG. 2 and described in greater detail further below in connection therewith). In certain other embodiments, the process 200 is implemented in a water-based vehicle, such as a boat, submarine, or other water-based vehicle. In yet other embodiments, the process 200 is implemented in an aircraft (e.g., an airplane, helicopter, spacecraft, and/or other aircraft).

The process 200 is also discussed below in connection with FIG. 3, with depicts exemplary images generated via various steps of the process 200, in various exemplary embodiments.

As depicted in FIG. 1, the process begins at step 202. In one embodiment, the process 200 begins when a vehicle drive or ignition cycle begins, for example when a driver turns on the vehicle and/or an ignition therefor (e.g. by turning a key, engaging a keyfob or start button, and so on). In another embodiment, the process 200 begins when a camera (such as camera 132 depicted in FIG. 2 and described further below) is activated. In one embodiment, the steps of the process 200 is performed during operation of the vehicle.

Camera images are obtained at step 204. Specifically, camera images are obtained for a camera (such as the camera 132 of FIG. 2). In various embodiments, each camera image comprises a two-dimensional image. Also in various embodiments, the camera image is represented as follows: A (x,y), in which "A" represents the camera image, and "x" and "y" represent the two-dimensional x and y axes, respectively, for the camera image. In various, the camera image is provided by the camera to a processor (such as the processor 142 of the computer system 140 depicted in FIG. 2 and described further below in connection therewith) for processing. With reference to FIG. 3, an exemplary camera image 304 is provided (e.g., representing a two-dimensional view of the fact of a driver 104 of the vehicle 100 of FIG. 2).

An inverse Fourier transform is applied for the camera image at step 206. Specifically, in various embodiments, a processor (such as the processor 142 of FIG. 2) applies an inverse Fourier transform for the camera image of step 204.

In various embodiments, an inverse Fourier transform being performed on A(x,y) is represented (with respect to 208 of FIG. 1) as follows:

$$A'(p,q)e^{i\phi(p,q)} = \frac{1}{m}\sum_{x=1}^{m}\frac{1}{n}\sum_{y=1}^{n}\omega_m^{(x-1)(p-1)}\omega_n^{(y-1)(q-1)}A(x,y),$$

in which A'(p,q) and $e^{i\phi(p,q)}$ are the amplitude part and phase part of the result from the inverse Fourier transform, respectively. $\omega_m$ and $\omega_n$ are the complex roots of unity, where $\omega_m$ is equal to $e^{i2\pi/m}$ and $\omega_n$ is equal to $e^{i2\pi/n}$ The input A(x,y) has m by n pixels, and the output A'(p,q)$e^{i\phi(p,q)}$ has the same number of pixels. Different coordinate systems, (p,q) and (x,y), are used for defining different space.

In various embodiments, the amplitude part of the inverse Fourier transform, A'(p,q), is discarded at 210. The phase part, a two dimensional "m" by "n" phase hologram, $e^{i\phi(p,q)}$, is retained for fast Fourier Transform (FFT) process at 212.

In various embodiments, during step 214, a two degree of freedom Fast Fourier Transform (2-DFFT) is performed on the phase part of the result of inverse Fourier transform, $e^{i\phi(p,q)}$, which is represented as follows (with reference to 216 of FIG. 1) $A''(x',y')e^{i\phi''(x',y')} = \sum_{p=1}^{m}\sum_{q=1}^{n}\omega'_m{}^{(p-1)(x'-1)}\omega'_n{}^{(q-1)(y'-1)}e^{i\phi(p,q)}$, in which A"(x',y') and $e^{i\phi''(x',y')}$ are the amplitude part and phase part of the result from the FFT, respectively. $\omega'_m$ and $\omega'_n$ are the complex roots of unity, where $\omega'_m$ is equal to $e^{-i2\pi/m}$ and $\omega'_n$ is equal to $e^{-i2\pi/n}$ The input $e^{i\phi(p,q)}$ has m by n pixels, and the output A"(x',y')$e^{i\phi''(x',y')}$ has the same number of pixels. Different coordinate systems, (p,q) and (x',y'), are used for defining different space. In various embodiments, the complex value(s) are converted to an intensity profile at 218.

Figure 3:
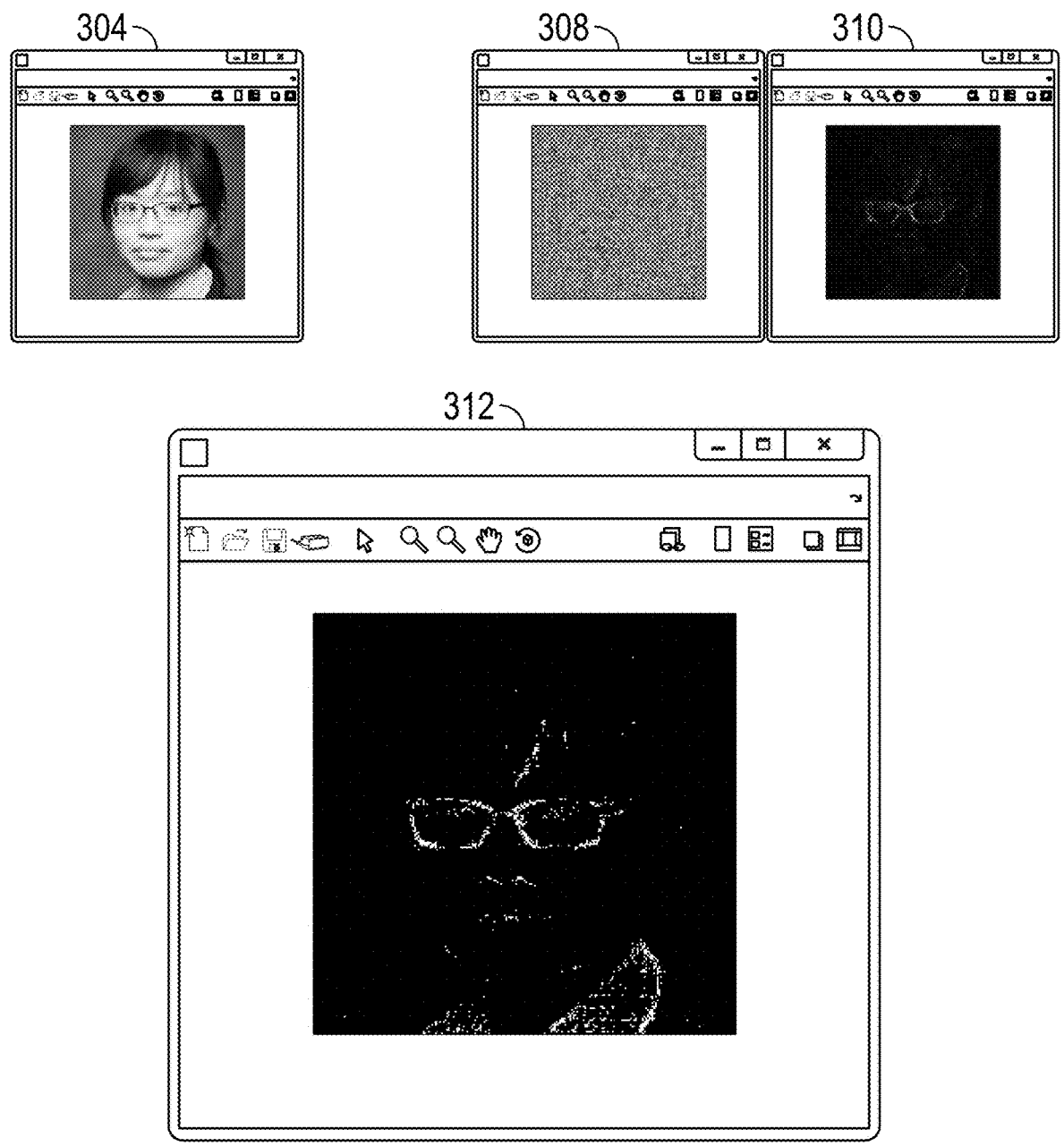
FIG. 3 depicts exemplary images generated via various steps of the process of FIG. 2, in accordance with exemplary embodiments.

With reference to FIG. 3, an exemplary phase-only hologram $e^{i\phi(p,q)}$ image 308 is provided, as generated from the initial camera image 304 of FIG. 3 via inverse Fourier Transform and discarding the amplitude part of iFFT, In various embodiments, the phase-only hologram 308 (and the generation thereof, using iFFT) utilizes only the phase information, and not directly from the pixel intensity information, from the camera image 304.

In various embodiments, the enhanced image |A"(x,y)|² (represented as 220 of FIG. 1), which is the square of the amplitude part of FFT, provides highlighted edges for the camera image, including of the face of the driver 104 of the vehicle 100. With reference to FIG. 3, an exemplary reconstructed image 310 is provided, as generated from the phase-only hologram 308 of FIG. 3 via FFT of FIG. 1, in accordance with an exemplary embodiment. In addition, the highlighted images of the face of the driver 104 are illustrated in the reconstructed image 310 of FIG. 3.

In certain embodiments, further noise reduction is provided for the image at step 222. For example, in certain embodiments, the processor 142 provides a further image process by defining a tuned threshold of |A" (x',y')|² and provide a noise-reduced edge-enhanced new image A'''(x',y') (represented as 224 in FIG. 1), as presented in image 312 to provide further highlight the edges (e.g., with an even clearer image of the edges of the face).

In various embodiments, the further enhanced image provides highlighted edges from the camera image, including of the face of the driver 104 of the vehicle 100 of FIG. 2, while further reducing noise that is unrelated to the outline of the driver 104's face. With reference to FIG. 3, an exemplary further reconstructed image 312 is provided. In addition, the highlighted images of the face of the driver 104 are illustrated in the further reconstructed image 312 of FIG. 3, with the edges (including of the eyes of the driver 104) further standing out in the further reconstructed image 312, and representing an edge-enhanced image of the face of the driver 104, An identification of the location of the eye is provided at step 226. In various embodiments, the processor 142 of FIG. 2 identifies the location of one or more eyes of the driver 104 using the phase model of the face of the driver 104, using the reconstructed images 310 and/or 312 of FIG. 3 with the highlighted edges of the driver 104's face in the image(s).

In various embodiments, one or more vehicle actions are provided at step 228, based at least in part on the identification of the one or more eyes of the driver. For example, in certain embodiments, the processor 142 may control the head-up display unit 120 of FIG. 2 based on the eye location(s). For example, in certain embodiments, the processor 142 may adjust an angle of a display of the head-up display unit 120 toward one or more of the eyes of the driver 104, for example so that the driver 104 can easily read information from the head-up display unit 120. In addition, in certain embodiments, the processor 142 may also utilize the eye location(s) in controlling one or more other systems 122 of the vehicle 100. For example, in certain embodiments, the processor 142 may provide instructions for a warning or alert, or for the taking of automatic control over more of the other systems 122 (such as braking, steering, or the like) if the driver 104 appears to be closing his or her eyes and/or not paying attention to the road.

In various embodiments, the process then returns to step 204 for a subsequent frame.

FIG. 2 illustrates a vehicle 100, according to an exemplary embodiment. As described in greater detail further below, the vehicle 100 includes a control system 102 for identifying a location of an eye of an occupant 104 of the vehicle 100. In various embodiments, the control system 102 is configured to identify a location of the eye of a driver 104 sitting in a front seat 106 of the vehicle 100, and to use the identified location for operation of a head-up unit 120 and/or one or more other systems 122 of the vehicle, using techniques described in connection with FIGS. 1 and 3.

In various embodiments, the vehicle 100 may comprise any number of different types of vehicles or mobile platforms. In certain embodiments, the vehicle 100 comprises a land-based vehicle, such as any one of a number of different types of automobiles, such as, for example, a sedan, a wagon, a truck, or a sport utility vehicle (SUV), motorcycle, and/or other land-based vehicles. In certain other embodiments, the vehicle 100 comprises a water-based vehicle, such as a boat, submarine, or other water-based vehicle. In yet other embodiments, the vehicle 100 comprises an aircraft (e.g., an airplane, helicopter, spacecraft, and/or other aircraft).

In the depicted exemplary embodiment, the vehicle 100 includes the above-referenced body 110 that is arranged on a chassis 109. The body 110 substantially encloses other components of the vehicle 100. The body 110 and the chassis 109 may jointly form a frame. The vehicle 100 also includes a plurality of axles 112 and wheels 114. The wheels 114 are each rotationally coupled to one or more of the axles 112 near a respective corner of the body 110 to facilitate movement of the vehicle 100. In one embodiment, the vehicle 100 includes four wheels 114, although this may vary in other embodiments (for example for trucks and certain other vehicles).

Also in the depicted exemplary embodiment, a drive system 116 is mounted on the chassis 109, and drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 2, in various embodiments the control system 102 includes a sensor array 130 and a computer system 140. In various embodiments, the control system 102 is mounted on the chassis 109.

In various embodiments, the sensor array includes one or more cameras 132 in proximity to the driver 104. In certain embodiments, the camera 132 is positioned within the head-up unit 120 of the vehicle 100 (e.g., within or on a front dash of the vehicle 100). In certain other embodiments, the camera 132 is positioned within or on a mirror 118 of the vehicle 100, such as a rear-view mirror. In various embodiments, the camera 132 is positioned toward the driver 104, particularly toward a face thereof, to capture images of the face of the driver 104. In certain embodiments, the sensor array 130 may also include one or more other sensors used for operation of the vehicle 100.

In various embodiments, the computer system 140 is coupled to the sensor array 130. In various embodiments, the computer system 140 received the camera images from the camera 132, and identifies the location of the eye of the driver 104 of the vehicle 100 using the camera images. Also as depicted in FIG. 2, in various embodiments the computer system 104 is coupled to the camera 132 via a communication link 111, and receives camera images from the camera 132 via the communication link 111. In certain embodiments, the communication link 111 comprises one or more wired connections, such as one or more cables (e.g. coaxial cables and/or one or more other types of cables), and/or one or more wireless connections (e.g. using wireless bus technology).

In various embodiments, the computer system 140 is further coupled to the head-up display unit and the other systems 122 of the vehicle 100. In certain embodiments, the computer system 140 also utilizes the eye location in performing one or more vehicle actions, such as, by way of example, controlling the head-up display unit 120 (e.g., by angling the head-up display unit 120 toward the driver 104's eye). In addition, in certain embodiments, the computer system 140 also utilizes the eye location in controlling one or more other systems 122 of the vehicle 100 (e.g., by providing a warning or alert, or taking automatic control over one or more of the other systems 122, such as braking, steering, or the like, if the driver 104 appears to be closing his or her eyes and/or not paying attention to the road).

In various embodiments, the computer system 140 performs these functions in accordance with the process 200 described above in connection with FIG. 1, and the implementations as set forth in FIG. 3.

In the depicted embodiment, the computer system 140 includes a processor 142, a memory 144, an interface 146, a storage device 148, and a bus 150. The processor 142 performs the computation and control functions of the computer system 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the computer system 140 and the computer system of the computer system 140, generally in executing the processes described herein, such as the process 200 described above in connection with FIGS. 1 and 3.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 154.

The bus 150 serves to transmit programs, data, status and other information or signals between the various components of the computer system of the computer system 140. The interface 146 allows communication to the computer system of the computer system 140, for example from a system driver and/or another computer system, and can be implemented using any suitable method and apparatus. In one embodiment, the interface 146 obtains the various data from the camera 132. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including direct access storage devices such as hard disk drives, flash systems, floppy disk drives and optical disk drives. In one exemplary embodiment, the storage device 148 comprises a program product from which memory 144 can receive a program 152 that executes one or more embodiments of one or more processes of the present disclosure, such as the steps of the process 200 (and any sub-processes thereof) described in connection with FIGS. 1 and 3. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the computer system 140 may also otherwise differ from the embodiment depicted in FIG. 2, for example in that the computer system of the computer system 140 may be coupled to or may otherwise utilize one or more remote computer systems and/or other control systems.

Accordingly, the disclosed methods, systems, and vehicles provide for identification of a location of one or more eyes of an occupant of a vehicle, such as the driver of the vehicle. In various embodiments, multiple Fourier transforms (including an inverse Fourier transform and a Fourier transform) are performed in order to generated an enhanced image from the camera image, including highlighted edges of the face of the driver 104. In various embodiments, the enhanced image is used for a for identification of the location of the one or more eyes of the driver, and for executing various vehicle commands that may be dependent upon the location of the one or more eyes. In addition, in various embodiments, the eye location is identified using the phase information from the processed camera pixelated intensity information. In various embodiments, this in turn allows for a wider scope of cameras for use in the disclosed methods, systems, and vehicles (e.g., particularly when the process is performed multiple times for a particular occupant, in which the image quality requirement for the camera may be further reduced due to familiarity with the occupant's face, and so on).

It will be appreciated that the systems, vehicles, and methods may vary from those depicted in the Figures and described herein. For example, the vehicle 100, the control system 102, and/or various components thereof may vary from that depicted in FIG. 2 and described in connection therewith, in various embodiments. It will similarly be appreciated that the steps and/or implementations of the process 200 may differ from those depicted in FIGS. 1 and 3, and/or that various steps of the process 200 may occur concurrently and/or in a different order than that depicted in FIGS. 1 and 3, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
    obtaining a camera image of an occupant of a vehicle, via a camera of the vehicle;
    performing, via a processor, one or more Fourier transforms of the camera image; and
    identifying, via the processor, a location for an eye of the occupant of the vehicle, using a phase model generated via the one or more Fourier transforms.

2. The method of claim 1, further comprising:
    performing a control action for the vehicle, based on the identified location of the eye.

3. The method of claim 1, wherein the step of performing the one or more Fourier transforms comprises performing, via the processor, an inverse Fourier transform of the camera image.

4. The method of claim 3, wherein the step of performing the one or more Fourier transforms further comprises performing, via the processor, a phase only transform, generating a phase-only hologram for the camera image.

5. The method of claim 4, wherein the step of performing the one or more Fourier transforms further comprises performing, via the processor, an additional Fourier transform, generating an enhanced image for the camera image.

6. The method of claim 5, wherein the enhanced image includes highlighted edges for a face of the occupant.

7. The method of claim 6, wherein the step of performing the one or more Fourier transforms further comprises performing image processing with a tuned threshold, generated a further enhanced image for the camera image that includes further highlighted edges for the face of the occupant.

8. A system comprising:
a camera configured to generate a camera image of an occupant for a vehicle; and
a processor coupled to the camera and configured to at least facilitate:
performing one or more Fourier transforms of the camera image; and
identifying a location for an eye of the occupant of the vehicle, using a phase model generated via the one or more Fourier transforms.

9. The system of claim 8, wherein the processor is further configured to at least facilitate performing a control action for the vehicle, based on the identified location of the eye.

10. The system of claim 8, wherein the processor is further configured to at least facilitate performing an inverse Fourier transform of the camera image.

11. The system of claim 10, wherein the processor is further configured to at least facilitate performing a phase only transform, generating a phase-only hologram for the camera image.

12. The system of claim 11, wherein the processor is further configured to at least facilitate performing an additional Fourier transform, generating an enhanced image for the camera image.

13. The system of claim 12, wherein the enhanced image includes highlighted edges for a face of the occupant.

14. The system of claim 13, wherein the processor is further configured to at least facilitate performing one or more further Fourier transforms with a tuned threshold, generated a further enhanced image for the camera image that includes further highlighted edges for the face of the occupant.

15. A vehicle comprising:
a body;
a drive system configured to move the body;
a camera mounted on the body, the camera configured to generate a camera image of an occupant for the vehicle; and
a processor coupled to the camera and configured to at least facilitate:
performing one or more Fourier transforms of the camera image; and
identifying a location for an eye of the occupant of the vehicle, using a phase model generated via the one or more Fourier transforms.

16. The system of claim 15, wherein the processor is further configured to at least facilitate performing a control action for the vehicle, based on the identified location of the eye.

17. The vehicle of claim 15, wherein the processor is further configured to at least facilitate performing an inverse Fourier transform of the camera image.

18. The vehicle of claim 17, wherein the processor is further configured to at least facilitate performing a phase only transform, generating a phase-only hologram for the camera image.

19. The vehicle of claim 18, wherein the processor is further configured to at least facilitate performing an additional Fourier transform, generating an enhanced image for the camera image, wherein the enhanced image includes highlighted edges for a face of the occupant.

20. The vehicle of claim 19, wherein the processor is further configured to at least facilitate performing one or more further Fourier transforms with a tuned threshold, generated a further enhanced image for the camera image that includes further highlighted edges for the face of the occupant.

* * * * *